(No Model.) 4 Sheets—Sheet 1.
J. H. PENDLETON.
MILL.
No. 458,662. Patented Sept. 1, 1891.
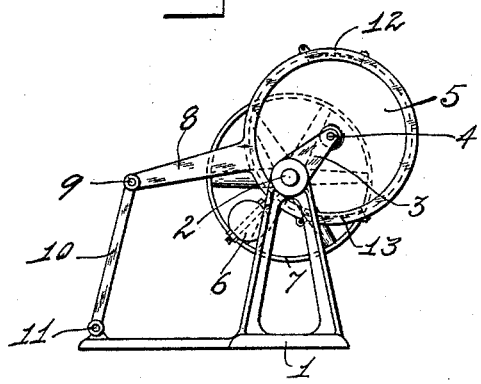
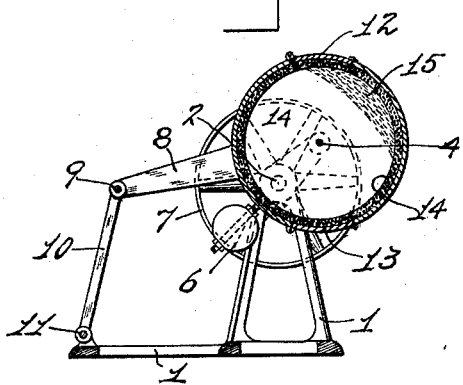
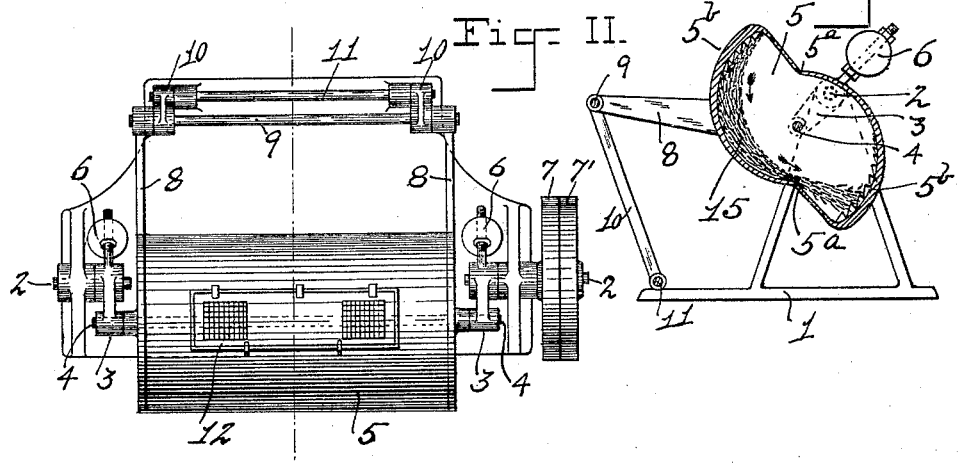
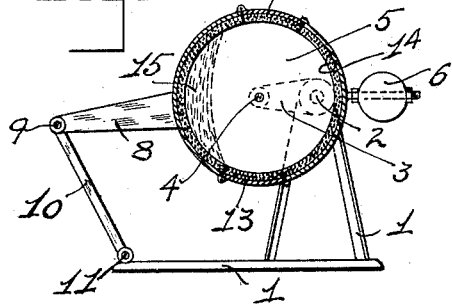
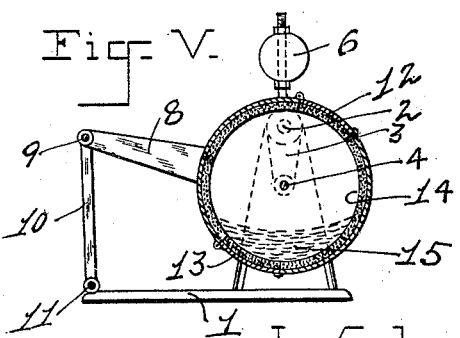
Witnesses
Chas. W. Thomas
W. J. Hendie
Inventor
John H. Pendleton.
by D. J. Newland
his Attorney.

(No Model.) 4 Sheets—Sheet 2.
J. H. PENDLETON.
MILL.
No. 458,662. Patented Sept. 1, 1891.
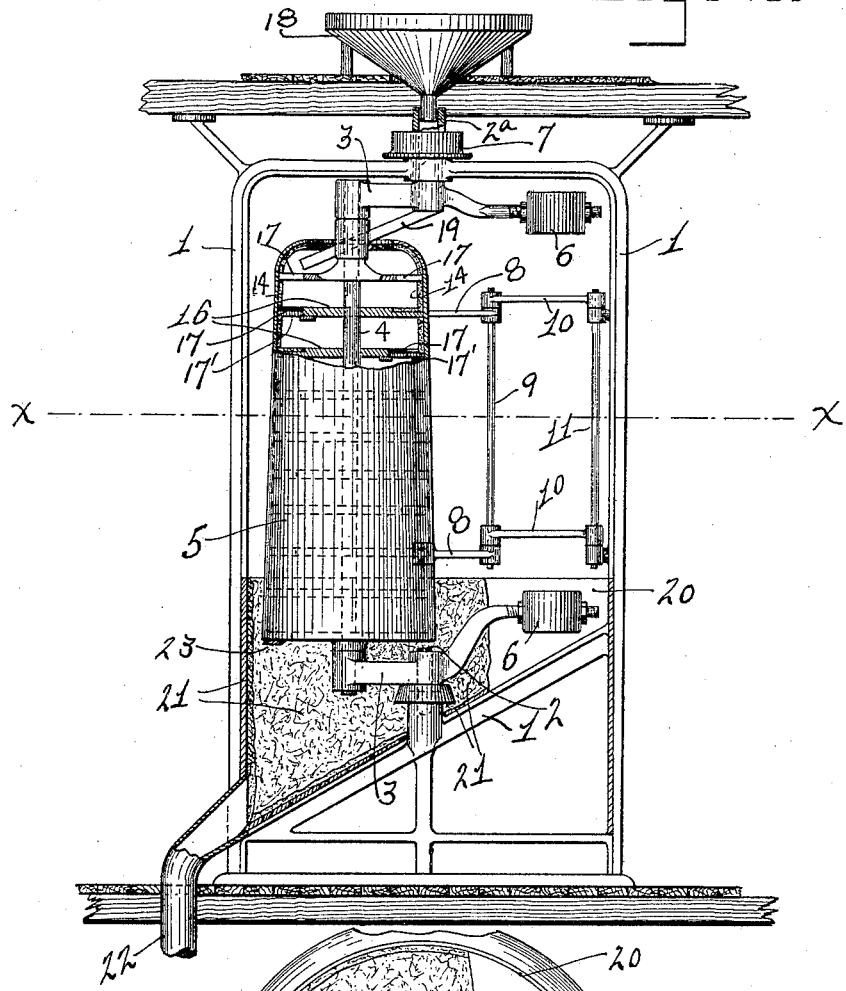
Fig. VI.
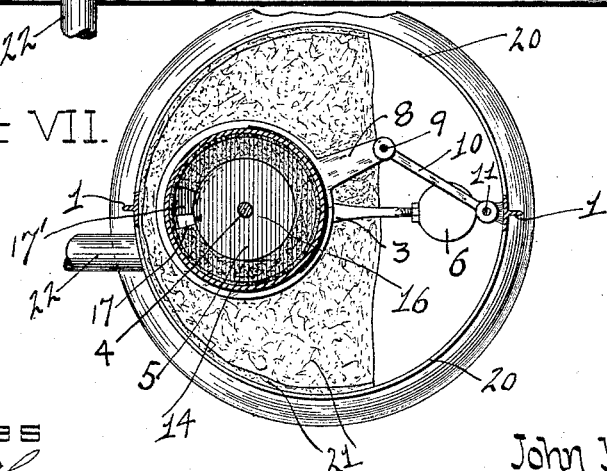
Fig. VII.
Witnesses
Chas. W. Thomas
Wm H Hendu
Inventor
John H. Pendleton.
by D. J. Newland
his Attorney.

(No Model.) 4 Sheets—Sheet 3.
J. H. PENDLETON.
MILL.
No. 458,662. Patented Sept. 1, 1891.
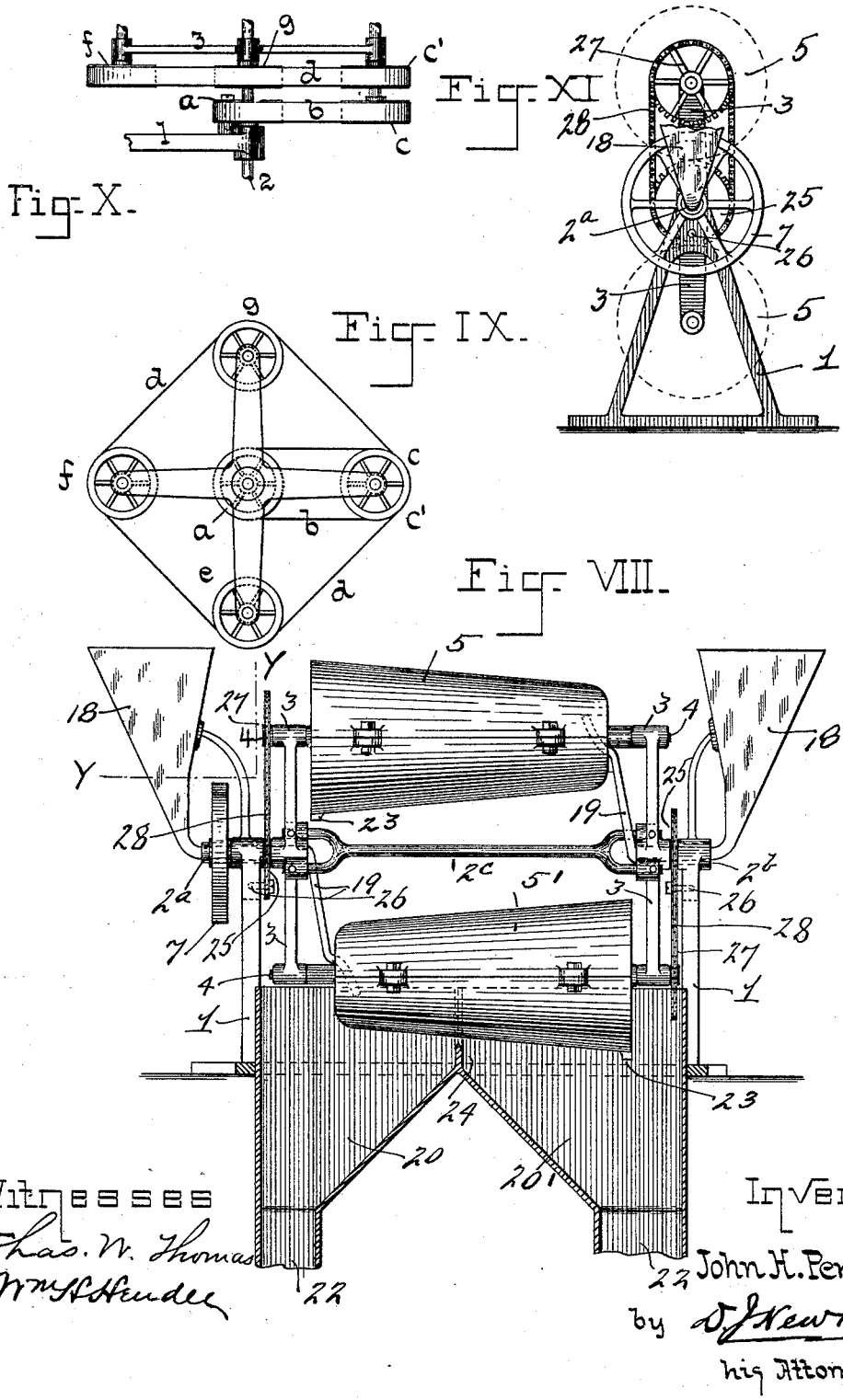
Witnesses
Chas. W. Thomas
Wm H. Hendel
Inventor
John H. Pendleton
by D. J. Newland
his Attorney.

(No Model.) 4 Sheets—Sheet 4.
J. H. PENDLETON.
MILL.
No. 458,662. Patented Sept. 1, 1891.
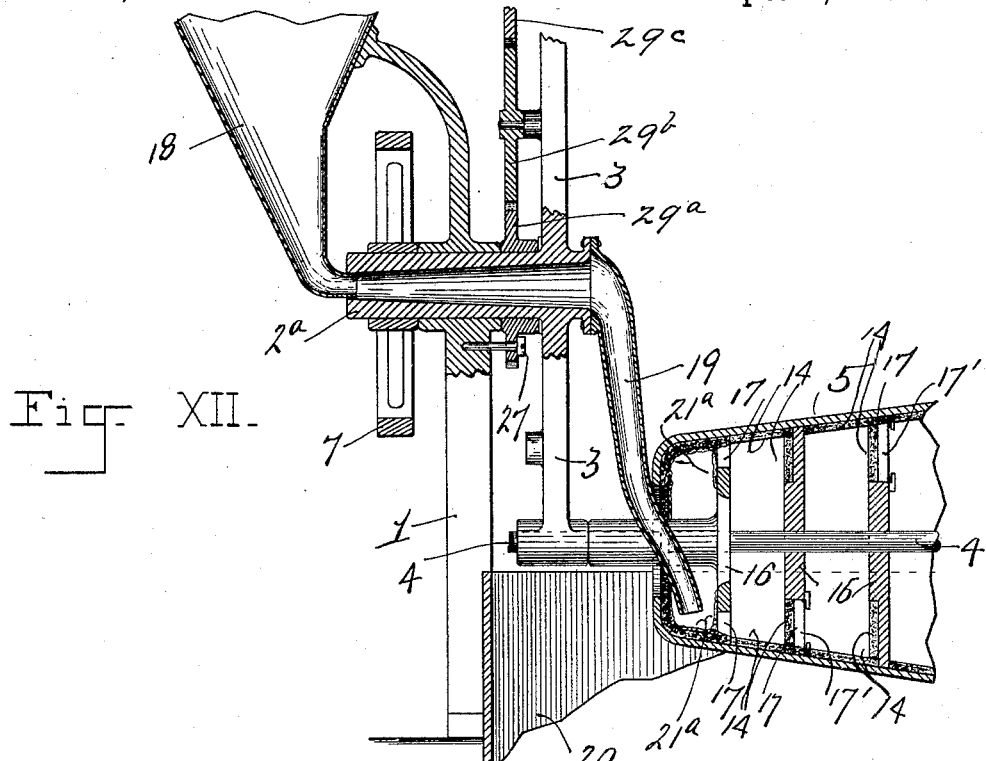
Fig. XII.
Fig. XIII.
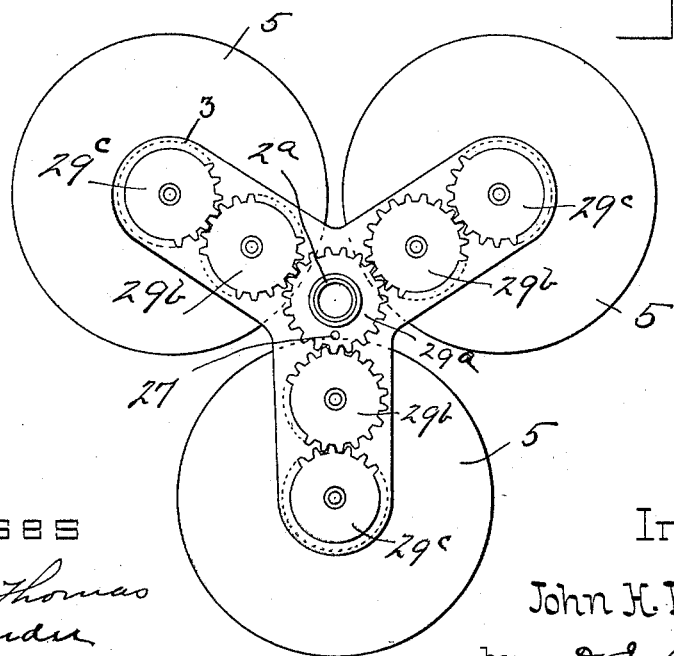
Witnesses
Chas. N. Thomas
Wm. H. Henden
Inventor
John H. Pendleton
by D. J. Newland
his Attorney.

UNITED STATES PATENT OFFICE.

JOHN H. PENDLETON, OF BROOKLYN, ASSIGNOR OF TWO-THIRDS TO DAVID J. NEWLAND AND CHARLES W. THOMAS, OF NEW YORK, N. Y.

MILL.

SPECIFICATION forming part of Letters Patent No. 458,662, dated September 1, 1891.

Application filed April 27, 1891. Serial No. 390,671. (No model.)

*To all whom it may concern:*

Be it known that I, JOHN H. PENDLETON, a citizen of the United States, and a resident of Brooklyn, in the county of Kings and State of New York, have invented certain new and useful Improvements in Mills, of which the following is a specification.

My invention has reference to improvements in mills, and especially to mills for hulling, grinding, screening, or separating and polishing grain and other substances, in which centrifugal force is utilized to produce pressure, while at the same time a relative motion is produced between the substance and the walls of the mill.

My invention consists in certain novel features in the construction of such mills, as fully pointed out in the following specification and claims, and illustrated in the accompanying drawings, in which—

Figure 1 represents an end elevation of a mill constructed in accordance with my invention. Fig. 2 is a plan view of the same. Figs. 3, 4, and 5 are cross-sections showing the positions of the various parts and the contents of the receptacle during certain periods of a revolution. Fig. 5ᵃ is a cross-section illustrating a modified form of the receptacle. Fig. 6 is a side elevation, partly in section, of a vertical mill with continuous feed. Fig. 7 is a section in the plane *x x*, Fig. 6. Fig. 8 is a side elevation of a duplex mill with double continuous feed arranged horizontally. Fig. 9 represents a detail view of belt connections that may be used with a system of four receptacles. Fig. 10 is a plan view of the same. Fig. 11 is a side elevation of the mill illustrated in Fig. 8, a portion being broken away on the line *y y*, Fig. 8. Fig. 12 is a sectional elevation on a larger scale than the preceding figures, showing the method of feeding the material from the hopper to the mill. Fig. 13 illustrates means whereby the motion can be obtained by the use of gearing.

Similar numerals indicate corresponding parts.

In the drawings, referring at present to Figs. 1 and 2, the numeral 1 designates a frame supporting the receptacle 5, into which the material to be treated is placed. 2 2 are short shafts, from which project two arms 3 3 to form crank-shafts. To the outer ends of said crank-shafts is secured the shaft 4, passing centrally through the receptacle 5, the latter either being free to turn upon said shaft or the shaft to turn in bearings in the arms 3 3. To one of the shafts 2 are attached the driving and loose pulleys 7 and 7'. 8 8 are levers attached at one end to the receptacle 5, their opposite ends having bearings on a horizontal shaft 9, which is rigidly secured to links 10 10, having their lower ends secured to a shaft 11, which has its bearings in the bed-plate of the frame 1. A door 12 is provided at the upper side of the receptacle for charging the same, and at the lower side a door 13 is provided for discharging. On the heads and inner walls of the receptacle linings 14 14 are applied, which are made up of material to suit the work to be performed—such, for instance, as buhr-stone, corrugated iron, or any other suitable material for hulling, grinding, scouring, pulverizing, or polishing, as the case may be. For grinding and the like a hard lining is necessary, while for polishing a softer one must be used. Suitable counterpoise-weights 6 6 are provided to balance the system. The material to be operated upon is placed into the receptacle 5, and shaft 2 is caused to revolve rapidly by means of pulley 7. The receptacle as a whole is thereby caused to revolve about the center line of shafts 2 2 as a center, but is always held approximately in the position shown in Fig. 1 by the action of the lever system—that is to say, the vertical diameter of the receptacle always remains approximately vertical. Consequently the charging-door is always at the top and the discharging-door at the bottom. In the motion of the receptacle about the shafts 2 as a center of revolution, which might also be called the "center of force," the tendency of its contents is to seek the farthest point; and since the receptacle is restrained, as described, the contents are caused to move on the walls of the receptacle in the same direction as the direction of revolution of the mill. Consequently a grinding action is produced with a pressure depending on the angular velocity of the mill, the contents making a complete circuit of the receptacle for each revolution of the mill.

In Figs. 3, 4, and 5 I have shown the mill at various stages of a revolution, with the attendant position of the contents. For separating or screening substances the receptacle is made foraminous, wholly or only in part, as shown in Fig. 2. When intended for drying grain or other cereals or malt, the receptacle should be made foraminous throughout.

In Fig. 5$^a$, I have shown a modified form for the receptacle 5, said form being such that the material 15 is forced to travel against the sides of the receptacle during a portion of the revolution, whereupon it is caused to jump from the part marked 5$^a$ to the roughened part 5$^b$, at the same time striking a blow and thus assisting the pulverization of any large particles. It is evident that the receptacle may be built in other forms for various purposes. Therefore I do not wish to restrict myself to any particular form.

In Figs. 6 and 7 I have illustrated a vertical mill with a continuous feed. In this construction the interior of the receptacle 5 is divided into a number of compartments by horizontal partitions 16, containing openings 17, alternating on opposite sides of the receptacle, said openings having adjustable covers 17' to regulate the downward feed. The receptacle is provided with a lining 14, of stone or other grinding, scouring, or polishing material, as the case may require, as described in the previous example. The material to be fed into the receptacle 5 is thrown into a stationary hopper 18, from which it passes through the hollow shaft 2$^a$ and the pipe 19, which latter is secured to the arm 3 and revolves with the receptacle into the upper compartment of the receptacle. From this compartment it falls into the second compartment, where the grinding action commences to take place against the lining 14. At each revolution a portion of the material passes through the respective opening 17 in the partition to the next compartment below, where the grinding action is repeated, and so on, until it is finally discharged through the spout 23 into a suitable bin 20. It will be noticed that the discharge takes place only when the receptacle is approximately in the position shown in the drawings, as in the other positions the mass is not above the spout, owing to the action of centrifugal force. The wall of the bin 20 is covered with a suitable padding 21 in case tender cereals or other substances are treated to prevent breakage by being discharged against the wall of the bin. From the bin the material is conducted away by means of the spout 22 to any convenient place. The arms 8 10, shafts 9 11, weights 6 6, and frame 1 are substantially the same as in the former example and need not be more fully described here.

In Figs. 8 and 11 I have shown a duplex system, in which two oppositely-placed receptacles are caused to revolve about a common axis, the use of counterpoises being then dispensed with, while two different substances may be treated at the same time, or the hulling may be done in one and the polishing or separating in the other. 1 is the frame supporting the system. 3 3 are vertical arms, having at their opposite ends bearings for the shafts 4 4 of the respective receptacles 5 and 5'. The arms are provided with central hollow trunnions 2$^a$ and 2$^b$, mounted to turn freely in bearings in the frame 1. A rod 2$^c$, forked at both ends, acts as a connection and stay between the arms and at the same time permits the feed-pipes 19 19 to the vessels 5 and 5' to pass between the forks. To one of the hollow trunnions is rigidly secured the driving-pulley 7 for revolving the system. To the shafts 4 4 are secured, respectively, the sprocket-wheels 27 27, which are connected by suitable chains 28 28 with two wheels 25 25, the latter being secured by pins 26 to the frame, so as to hold them stationary. Thus it will be seen that upon revolving the system the two receptacles are held always with the discharge spouts or openings 23 down, the same result being produced relative to the movement of the contacts, as before explained. The material with which the receptacles are to be charged is thrown into the hoppers 18 18, (see also Fig. 12,) from whence it passes into the hollow shafts 2$^a$, the latter being slightly flared to facilitate the flow of material into the pipes 19 19, which lead to the first compartments of the respective receptacles 5 and 5', said compartments being padded to prevent breakage of the grain. The interior of each receptacle is the same as shown in Figs. 6 and 7 and need not be more fully described here. The discharge takes place through the spouts 23 23 into different bins 20 and 20', and the material is finally led away by suitable troughs 22 22. It will be noticed that the discharge from the receptacles can take place only when they are in their lowest positions—i. e., that in which receptacle 5' is shown to be in the drawings—as the centrifugal action causes the contents of the same to be held away from the discharge-openings when the receptacles are in their other positions.

In Figs. 9 and 10 I have illustrated a driving-gear for a quadruplex system, the same consisting of a stationary pulley $a$, around which a belt $b$ is placed, which connects with a pulley $c$ and controls the motion of the same. On the same shaft as pulley $c$ is mounted a pulley $c'$, which controls the system of receptacles to which the pulleys $c'$, $e$, $f$, and $g$ are attached, said four pulleys being connected by an endless belt $d$, passing round the same. Chains and chain-wheels may be substituted for the belts and pulleys.

In Fig. 13 I have shown the receptacles 5 as controlled by gearing. (See also Fig. 12.) In this example three receptacles are shown as revolving about a common axis. 29$^a$ represents a gear mounted loosely upon the hollow trunnion 2ª and prevented from rotating by means of the pin 27 passing through the same and entering the frame 1. 29ᶜ represents gears made fast to the respective shafts 4 of the receptacles, and 29ᵇ are intermediate gears having bearings on horizontal studs secured to the arms 3, said gears serving to connect gears 29ᶜ with the gear 29ª. It is now evident that if the arms are caused to revolve the several gears will control the receptacles in the manner before described. If desired, the gears may be so proportioned that the receptacles will actually have a rotary motion imparted thereto about their centers at any desired speed, so as to produce a greater or relative motion between the contents and the walls of the receptacle, or else by rotating the receptacles in the same direction as the movement of the material a less relative motion is obtained.

It is evident that various other means could be made use of to control the receptacles in the manner described. Therefore I do not wish to restrict myself to any of the specific means herein described, nor do I wish to restrict myself to holding the receptacle in one and the same position, as on some materials I have found by experiment that it is advantageous to permit of or give to the receptacle a movement about its own axis in one direction or the other.

In order that the lining may be exchanged, using the same receptacle for grinding, scouring, polishing, or other kindred purpose, the same is made removable, either by having the receptacle formed of two shells bolted together, as shown in Fig. 8, or by having one or both of the heads removable.

What I claim as new, and desire to secure by Letters Patent, is—

1. In a mill, a receptacle caused to revolve and means for rotating the receptacle about its own axis in the same direction as the direction of revolution, substantially as described.

2. A receptacle revolving about a fixed axis, combined with a stationary hopper arranged in line with said axis of revolution and a feed-pipe connected with said hopper and having a portion rotating about said fixed axis and a radial portion extending into and revolving with the receptacle, substantially as described.

3. The receptacle 5, mounted to rotate about a central axis and provided with a series of compartments connected by contracted openings, means for causing the receptacle to revolve about a second axis, and a mechanism acting on the receptacle for controlling its motion about its central axis while revolving, substantially as described.

4. In a mill, a receptacle caused to revolve, combined with a stationary gear concentric with the axis of revolution, a second gear on the receptacle, and an intermediate gear, all proportioned to hold the receptacle in a definite position while revolving, substantially as described.

5. In a mill, two or more receptacles caused to revolve about a common axis, a stationary gear arranged concentric with the axis of revolution, gears attached to the several receptacles, and intermediate gears, all proportioned to hold the receptacles in certain definite positions, substantially as described.

6. In a mill, a receptacle caused to revolve and held in a certain definite position by a stationary pulley or chain wheel arranged concentric with the axis of revolution, and a second pulley or chain wheel secured to the receptacle and connected by a belt or chain with the first wheel, substantially as described.

7. The receptacle 5, having the irregular form described and provided with roughened portions 5ᵇ, combined with means for revolving the receptacle and controlling its position, the form of said receptacle allowing the material to fly off tangentially and against the roughened parts, substantially as described.

8. In a mill, a receptacle for the material to be treated, crank-shafts and cranks, the cranks pivoted to journals projecting from the receptacle, a driving-pulley for rotating the crank-shafts and revolving the receptacle, and an arm or arms projecting from the receptacle and pivoted to a link or links pivoted to a fixed part, substantially as shown and described.

9. In a mill, a receptacle for the material to be treated, having a counterpoise attached, means for revolving the receptacle, and an arm or arms projecting from the receptacle and pivoted to a link or links pivoted to a fixed part, substantially as described.

10. In a mill, a receptacle for the material to be treated, having a counterpoise attached, crank-shafts and cranks, the latter connected to journals projecting from the receptacle, a driving-pulley for rotating the crank-shafts and revolving the receptacle, and means for rotating the receptacle on the axis of the journals, substantially as shown and described.

11. In a mill, a receptacle for the material to be treated, having a balance-weight attached, crank-shafts and cranks, the cranks pivoted to journals projecting from the receptacle, a driving-pulley for rotating the crank-shafts and revolving the receptacle, and an arm or arms projecting from the receptacle and pivoted to a link or links pivoted to a fixed part, substantially as shown and described.

12. In a mill, the combination of the frame 1, shafts 2 2, cranks 3 3, journals 4 4, receptacle 5, provided with means for charging the material and for discharging the same and with lining 14, a balance-weight 6, driving-pulley 7, and arms 8, projecting from the receptacle and pivoted to links 10, pivoted to fixed parts of the machine, substantially as and for the purpose specified.

13. In a mill, the combination of frame 1, shafts 2 2, cranks 3 3, journals 4 4, receptacle 5, provided with charging-door 12 and discharging-door 13, lining 14, counterpoise 6, driving-pulley 7, and arms 8, projecting from the receptacle and pivoted to links 10, pivoted to fixed parts of the machine, substantially as and for the purpose specified.

14. The receptacle 5, provided with compartments opening in the partitions at alternate sides, means for causing the receptacle to revolve, and means for holding it in a fixed position with respect to its axis, substantially as described.

15. A receptacle provided with an interior padding of soft material at its receiving end to avoid breakage of the grain while entering said receptacle, substantially as described.

In testimony that I claim the foregoing as my invention I have signed my name, in presence of two witnesses, this 24th day of April, 1891.

JOHN H. PENDLETON.

Witnesses:
CHAS. W. THOMAS,
M. V. BIDGOOD.